United States Patent Office 3,110,699
Patented Nov. 12, 1963

3,110,699
REACTION PRODUCTS OF ETHYLENICALLY UNSATURATED POLYMERS AND PHENOLIC COMPOUNDS
Robert Schmitz-Josten, Cologne-Stammheim, Germany, assignor to Farbenfabriken Bayer Aktiengesellschaft, Leverkusen, Germany, a corporation of Germany
No Drawing. Filed Apr. 21, 1959, Ser. No. 807,751
Claims priority, application Germany Apr. 26, 1958
8 Claims. (Cl. 260—62)

The present invention relates to the reaction of ethylenically unsaturated polymers with phenolic compounds and to the products resulting from said reaction.

It is known that o-alkylated phenols are obtained by reacting phenols at relatively high temperatures with monoolefins in the presence of such metals as aluminum, zinc, magnesium, calcium, sodium and lithium, or in the presence of phenolates of these metals. It is also known that products containing up to 5% by weight of phenolic groups can be obtained by cyclizing natural rubber with acid catalysts in the presence of phenols.

It has now been found that valuable high molecular weight addition products having a substantially higher phenolic content can be obtained by reacting high molecular weight ethylenically unsaturated polymers with aromatic compounds containing at least one phenolic hydroxyl group at an elevated temperature and in the presence of either aluminum or an aluminum phenolate.

Suitable high molecular weight ethylenically unsaturated polymers are for example natural rubber, gutta percha, polymers and copolymers of conjugated diolefins having preferably 4 to 6 carbon atoms, such as butadiene, isoprene, dimethyl butadiene, piperylene, cyclopentadiene, as well as copolymers of said conjugated diolefins with monoethylenically unsaturated compounds, such as monoethylenically unsaturated aliphatic hydrocarbons, for instance ethylene, propylene, and isobutylene; vinyl aromatic compounds as for instance styrene, vinyl naphthalene, p-methyl-stylene, ethyl-styrene, p-chlorostyrene, 2,4-dichlorostyrene, alpha-methyl-styrene or other styrenes which are substituted in the benzene nucleus or in the alpha position; vinyl esters as for instance vinyl chloride, vinyl acetate, and vinyl propionate; ethylenically unsaturated nitriles as for instance acrylonitrile and, methacrylonitrile; esters of alpha-beta-ethylenically unsaturated carboxylic acids as for instance acrylic-methacrylic-maleic, and fumaric acid with saturated monohydric aliphatic and cycloaliphatic alcohols having 1 to 20 carbon atoms as for instance methanol, ethanol, propanol, isopropanol, butanol, isobutanol, dodecanol, and cyclohexanol. These copolymers may have incorporated therein about 0.5-95 percent by weight of the aforementioned monoethylenically unsaturated monomers. It is furthermore possible to incorporate into said polymers and copolymers small amounts of non-conjugated monomers such as divinyl benzene, or ethylene dimethacrylate.

The ethylenically unsaturated polymers and copolymers can be produced in block, solution, or emulsion form with the aid of known polymerization catalysts, for example with peroxides by Redox polymerization, by polymerization in the presence of Friedel-Crafts catalysts and also by anionic polymerization using alkali metals or organo-metallic compounds such as lithium alkls or aryls, or aluminum alkyls in the presence of compounds of metals of the 4th to 6th B sub-groups of the Mendeleef Periodic Table of the elements, as for instance titanium tetrachloride, or similarly acting catalysts.

The minimum molecular weight of the aforementioned polymers and copolymers should be about 5000, and preferably 10,000, whereas the maximum molecular weight may vary within wide limits, and may amount up to several millions. As it becomes apparent from the above disclosure, the polymers and copolymers consist essentially of ethylenically unsaturated hydrocarbons which may be substituted by alkyl, aryl, nitrile, carbonic acid ester, or acyl groups.

Phenols suitable for employment in the process of the present invention are those phenols, naphthols and other aromatic hydroxy compounds in which at least one o-position relative to the phenolic hydroxy group is unsubstituted or is substituted by a substituent, such as by a tertiary butyl group, which may be split off during the reaction. Polyhydric phenols are also suitable for employment in the present process. It is also possible to use mixtures of phenols. 4-alkylated and 2,4-dialkylated phenols have proved particularly suitable for employment in the process of the present invention since they give rise to high molecular weight alkylation products which are particularly light in color and light-fast. The alkyl groups of said alkylated phenols, especially of said monoalkylated phenols, may contain 1 to 20 carbon atoms. In this connection it should be noted for example that 2,4-disubstituted phenols cannot be converted into high molecular weight condensation products by reaction with aldehydes nor by other means. Examples of suitable phenols are phenol, cresols, 2,4-, 3,4-, 2,5-, 3,5-xylenols, pyrocatechol, resorcinol, hydroquinone, alpha-naphthol, beta-naphthol, ethyl phenol, propyl phenol, tert. butyl phenol, p-dodecyl phenol, 2,6-di-tert-butyl phenol, cyclohexyl phenol, and also the monoalkyl ethers of dihydric phenols, the alkyl groups of which contain 1 to 12 carbon atoms. The preferred compounds are the monohydric phenols.

The process of the present invention is preferably carried out at a temperature of from 80° C. to 250° C.; temperatures of from 120° C. to 220° C. being preferred. It is also preferable to employ a molar excess of the phenol reactant as calculated on the amount of ethylenically unsaturated groups present in the polymers. The phenols are usually applied in amounts of 1 to 10 mols per one aliphatic carbon-to-carbon double bond present in the polymer. This corresponds to about 50 to 1000 grams of phenolic compound as calculated on 100 grams of polymer. It is also advantageous to employ solution promoters such as aliphatic or aromatic hydrocarbons or halogenated derivatives thereof when the ethylenically unsaturated polymers cannot be satisfactorily dissolved or swelled in the phenols. This is the case when phenol itself is reacted with most polymeric unsaturated hydrocarbons, such as natural rubber, polybutadiene, or butyl rubber. In such cases, the reaction is greatly accelerated by employing solution promoters. Alkylated phenols, such as p-tert. butyl phenol or 2,4-dimethyl phenol, have a better dissolving or swelling power than phenol itself for the high molecular weight ethylenically unsaturated polymers or copolymers and hence it is not necessary to add solution promoters when alkylated phenols are employed. The miscibility of the reactants is improved during the course of the reaction by the incorporation of phenolic groups into the high molecular weight polymers, so that usually homogeneous solutions result on completion of the reaction. Suitable solution promoters are for instance saturated aliphatic hydrocarbons having 3 to 20 carbon atoms; aromatic hydrocarbons, such as benzene, toluene, xylene, and halogenated aromatic hydrocarbons such as chlorobenzene, or dichlorobenzene.

The amount of catalyst employed is preferably from 0.1 to 10 percent by weight of aluminum or an equivalent amount of an aluminum phenolate and based on the polyolefin. An amount of catalyst of from 1 to 4 percent is generally sufficient. The reactants should preferably be substantially freed from water before the catalyst is added.

The aluminum or aluminum phenolate is either dissolved in the phenol prior to adding the polymer, or the polymer is swelled in the phenol, any water present is removed by distillation and then metallic aluminum, aluminum phenolate or other aluminum compound capable of reacting with the phenol to give aluminum phenolate, such as an aluminum alcoholate or aluminum alkyl is added. The catalyst can be destroyed after completion of the reaction in known manner by adding water, acids, bases or complex formers, such as acetyl acetone or ethyl acetoacetate. For many purposes of use, for example for the production of pigmented lacquer solutions or printing pastes, it is not necessary to remove the aluminum from the reaction product. Unreacted phenol is simply distilled off in vacuo or removed by steam distillation and the reaction product is dissolved in a suitable solvent.

During the reaction disclosed above, the ethylenically unsaturated groups of the disclosed polymers are most probably converted into ethylene groups of the formula:

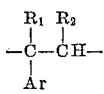

in which $R_1$ and $R_2$ stand for a member of the group consisting of hydrogen, and a methyl group, and Ar stands for an aromatic group having a phenolic hydroxy group in ortho-position to the carbon atom linked to the ethylene group. More specifically these groups correspond to the formula:

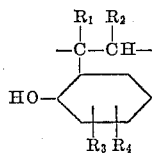

in which $R_1$ and $R_2$ have the same meaning as pointed out above and in which $R_3$ and $R_4$ stand for members of the group consisting of hydrogen, alkyl, and hydroxyalkyl, and $R_3$ and $R_4$ together stand for a fused benzene ring. The number of the ethylenically unsaturated groups which are converted into said ethylene groups depends on the amount of phenolic compounds and on the reaction conditions applied during the reaction. In principle, it is possible to convert all ethylenically unsaturated groups present in the polymers into said saturated ethylene groups.

The high molecular weight phenol derivatives obtained by the process of the present invention are usually hard, light colored, film-forming plastics. Their properties differ substantially from those of the starting products, the difference being the greater the higher the phenolic content. The solubility of the products varies within wide limits. Their solubility in solvents containing oxygen, such as esters, ketones or higher alcohols, increases with increasing phenolic content this being important for many purposes of use. Similarly, the higher the phenolic content of the products the more compatible they are with other plastics and lacquer raw materials such as drying oils or alkyd resins.

The high molecular weight products of the process of the present invention containing phenolic groups are especially suitable for use as raw materials for lacquers, as impregnating agents, as additives for printing pastes, as emulsifiers for improving the adhesion of tire cord and also as additives for phenol resins. They may also be subjected to further reactions, such as alkylation, esterification with saturated or unsaturated carboxylic acids, etherification, oxethylation or coupling with diazonium salts.

They can be converted into the insoluble state by means of aldehydes, methylol compounds or diisocyanates. They can also be transformed into insoluble aluminum salts with the aid of aluminum alcoholates or complex compounds of aluminum, such as for example aluminum acetyl acetonate.

In order that the invention may be more clearly understood, the following examples are given by way of illustration only. In these examples all parts are by weight unless otherwise stated.

*Example 1*

1 part of aluminum chips is dissolved in 200 parts of phenol at a temperature of from 150° C. to 170° C. 100 parts of lacquer benzine and 50 parts of natural rubber are added to the solution thus obtained, and the mixture is stirred in a nitrogen atmosphere for 1 hour at 140° C. and thereafter for 16 hours at 170 to 175° C. The natural rubber dissolves after a few hours and the unreacted phenol is distilled off in vacuo. The residue is an aluminum salt of high-molecular weight phenol. It is dissolved in toluene with addition of 20 parts of acetoacetic ester and precipitated with methanol. The product is washed with methanol and dried. 55 parts of a light-colored hard resin are thus obtained, a sample of which, after being precipitated several times from benzene-methanol was found to have a phenol content of 19.4 percent. The product is soluble in benzine-alcohol mixtures, toluene, chlorobenzene, methylene chloride, butanol and butyl acetate.

*Example 2*

100 parts of comminuted natural rubber are added to a solution of 4 parts of aluminum in 400 parts of 4-tert.-butyl phenol and the mixture is stirred for 17 hours at 170–175° C. 50 parts by volume of acetoacetic ester are added to the thin liquid solution and the mixture is then stirred in methanol. The product, which precipitates in the form of granules, is freed from unreacted phenol by reprecipitation from benzene-methanol and then dried. The product is colorless, and, in contrast to the product obtained in Example 1, is soluble in lacquer benzine, and also in aromatic substances, halogenated hydrocarbons and butyl acetate. Its phenol content is 23.3 percent.

*Example 3*

The tert.-butyl phenol in Example 2 is replaced by the same quantity of 2,4-dimethyl phenol (2,4-xylenol). A pure white product is obtained after a reaction period of 16 hours at 180° C., which is also soluble in benzine, aromatic compounds, chlorinated hydrocarbons and butyl acetate. Its phenol content is 13.7 percent.

*Example 4*

1 part of aluminum is dissolved in 200 parts of phenol. 100 parts of lacquer benzine and 50 parts of a polyisoprene polymerized with lithium are then added and the mixture heated for 2 hours at 140–180° C. and thereafter for 16 hours at 180° C. The product is worked up as in Example 1 and after purification by reprecipitation was found to contain 21.8 percent of phenol. It is soluble in aromatic substances, benzine-alcohol mixtures, acetic ester and butanol.

*Example 5*

4 parts of aluminum are dissolved in 400 parts of phenol. To this solution are then added 200 parts of lacquer benzine and 100 parts of a "cold rubber" consisting of the copolymer of 28 parts of styrene and 72 parts of butadiene having a Defo value of 1500 and regulated with tert.-dodecyl-mercaptan as a chain transfer agent. The resulting mixture is heated for 2 hours at 140° C. and thereafter for 28 hours at 160–180° C. The reaction product is isolated after cooling by precipitation into a mixture of methanol and dilute hydrochloric acid, whereupon it is washed and dried. 110 parts of a hard powder which is soluble in benzine-alcohol mixtures, aromatic substances, esters and butanol are thus obtained.

The powder was found to contain 6.45 percent of hydroxy groups, corresponding to 35.6 percent of phenol.

Example 6

100 parts of the emulsion copolymer described in Example 5 and having incorporated therein 28 parts of styrene and 72 parts of butadiene are swelled in a solution of 4 parts of aluminum and 500 parts of 4-tert. butyl phenol for 1 hour at 160–180° C. and then heated for 17 hours at 200° C. The excess phenol is removed by steam distillation and after drying the distillation residue a hard resin is obtained, which is separated from aluminum hydroxide by dissolving it in benzene and by subsequent filtration. The product is soluble in benzine-alcohol mixtures, acetic ester, butyl acetate, butanol and chlorinated hydrocarbons. It contains 3.35 percent of hydroxy group corresponding to 29.6 percent of 4-tert.-butyl-phenol incorporated and the yield is 131 parts.

Example 7

100 parts of a weakly regulated emulsion copolymer prepared at 5° C. from 40 parts of styrene and 40 parts of butadiene having a Defo value of 2650 and containing 40.7 percent of elastic constituent are added to a solution of 4 parts of aluminum in 400 parts of 4-tert. butyl phenol. The mixture is heated for 18 hours at 190–200° C. After adding 50 parts of glacial acetic acid, the reaction product is isolated by precipitation by a mixture of methanol and water. It is soluble in lacquer, benzine-alcohol mixtures and also in aromatic substances, chlorinated hydrocarbons, esters and higher alcohols. It has a hydroxy content of 4.25 percent corresponding to 37.4 percent of 4-tert.-butyl-phenol and the yield is 121 parts.

Example 8

100 parts of a dried emulsion polymer of butadiene having a Defo value of 3700 and containing 49 percent of elastic constituent, which polymer has been prepared at 5° C. and is unregulated but still swellable, is added to a solution of 4 parts of aluminum in 500 parts of 4-tert. butyl phenol. The polymer is swelled for some hours at 160–180° C. and thereafter the mixture is heated for 20 hours at 205–210° C., the polymer gradually dissolving. Thereafter, unreacted tert. butyl phenol is removed by steam distillation and the residue containing aluminum hydroxide is dried. 210 parts of a slightly brown brittle product are thus obtained which dissolves in hot benzine aromatic substances, ketones, esters, aliphatic halogenated hydrocarbons and alcohols after it has been freed from aluminum hydroxide. It has a tert. butyl phenol content of 51 percent.

What I claim is:

1. A process for the production of soluble high molecular weight compounds containing phenolic groups which comprises reacting in a substantially anhydrous medium an ethylenically unsaturated polymer of a conjugated diolefin having 4–6 carbon atoms and having a molecular weight of at least 5000 at a temperature of 80 to 250° C. with an aromatic compound having at least one phenolic hydroxy group in which at least one ortho-position relative to the phenolic hydroxy group is unsubstituted, in the presence of about 0.1 to 10 percent by weight of aluminum as calculated on the weight of said ethylenically unsaturated polymer.

2. A process according to claim 1, wherein said ethylenically unsaturated polymer is a copolymer of a conjugated diolefin having 4 to 6 carbon atoms with a monoethylenically unsaturated compound which is copolymerizable with said conjugated diolefin.

3. A process according to claim 1, wherein said aluminum is applied in the form of the aluminum salt of an aromatic compound having at least one phenolic hydroxy group in which at least one ortho-position relative to the phenolic hydroxy group is unsubstituted.

4. A process according to claim 1, in which said aromatic compound having at least one hydroxy group is substituted in at least one ortho-position by a substituent which is split off during the reaction.

5. The process of claim 1 wherein said substantially anhydrous medium comprises an inert organic solvent capable of at least swelling said ethylenically unsaturated polymer.

6. A polymer of a conjugated diene of 4–6 carbon atoms with a molecular weight of at least 5,000 which contains recurring units of the formulae:

I.

and

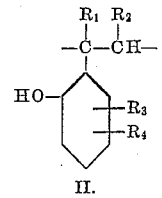

II.

wherein $R_1$ and $R_2$ each stand for a member selected from the group consisting of hydrogen and $-CH_3$, and $R_3$ and $R_4$ represent a member selected from the group consisting of hydrogen, alkyl, and hydroxyalkyl, and wherein $R_3$ and $R_4$ together may represent a fused benzene ring, the

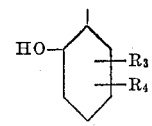

substituents in Formula II above being present in an amount of from about 13–51% by weight of the polymer.

7. A copolymer of a conjugated diene of 4–6 carbon atoms and a monoethylenically unsaturated monomer selected from the group consisting of ethylene, propylene, isobutylene, styrene, vinyl naphthalene, p-methylstyrene, ethylstyrene, p-chlorostyrene, 2,4-dichlorostyrene, alpha-methylstyrene, a vinyl ester, an ethylenically unsaturated nitrile, and an ester of an alpha,beta-ethylenically unsaturated carboxylic acid, said copolymer having a molecular weight of at least 5,000 and containing recurring units of the formulae:

I.

and

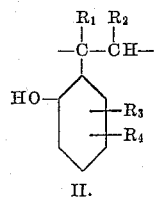

II.

wherein $R_1$ and $R_2$ each stand for a member selected from the group consisting of hydrogen and $-CH_3$, and $R_3$ and $R_4$ represent a member selected from the group consisting of hydrogen, alkyl, and hydroxyalkyl, and wherein $R_3$ and $R_4$ together may represent a fused benzene ring, the

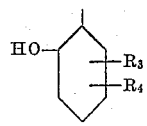

substituents in Formula II above being present in an amount of from about 13–51% by weight of the polymer.

8. The polymer of claim 11 wherein the
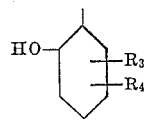
substituent is in the form of an aluminum salt group.
References Cited in the file of this patent
UNITED STATES PATENTS
2,553,470    Pines et al. _____ May 15, 1951
2,864,868    Bader _____ Dec. 16, 1958